F. H. Manny.
Mower.
Nº 1193
32,197
Patented April 30, 1861.
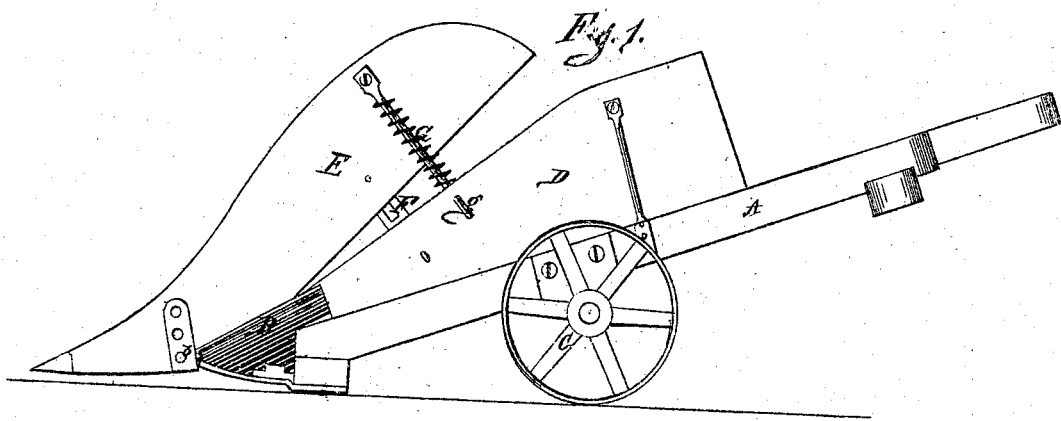
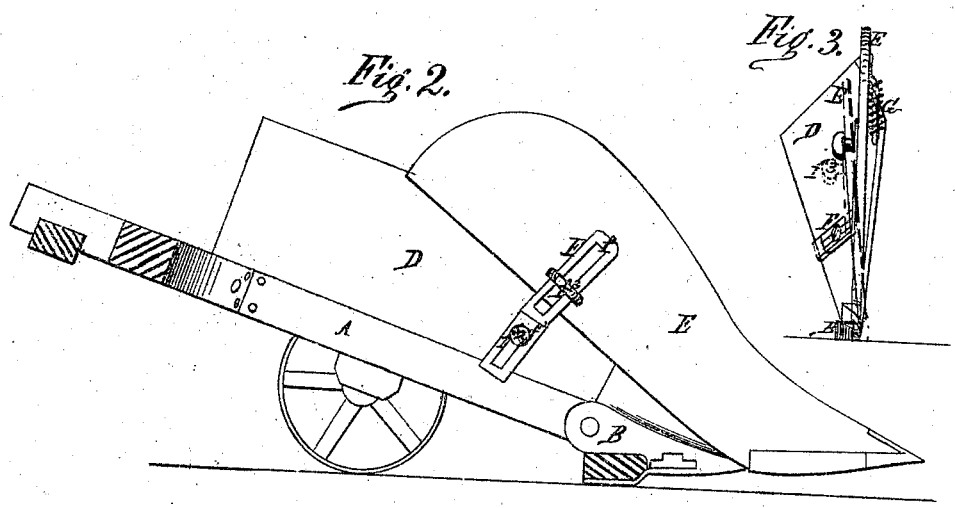

UNITED STATES PATENT OFFICE.

FREDERICK H. MANNY, OF ROCKPORT, ILLINOIS.

IMPROVEMENT IN HARVESTING-MACHINES.

Specification forming part of Letters Patent No. 32,197, dated April 30, 1861.

*To all whom it may concern:*

Be it known that I, FREDERICK H. MANNY, of Rockford, in the county of Winnebago and State of Illinois, have invented certain new and useful Improvements in Harvesters, of which the following is a full, clear, and exact description, reference being had to the accompanying drawings, which make part of this specification, and in which—

Figure 1 represents a view in elevation of the divider or grain side of a harvesting-machine to which my improvements are applied, as the same would appear to a spectator stationed outside of and opposite the machine, the several parts being represented in the attitude they assume when mowing, the supplementary divider (to which my improvements more especially relate) being adjusted to run close to the ground. Fig. 2 represents a similar view of the same, (partly in section,) as seen by a spectator stationed upon the gearing side of the machine and looking toward the grain-wheel, the supplementary divider being shown as adjusted in such manner that its point may run a short distance above the surface of the ground; and Fig. 3 represents a front view of the same, showing more especially the manner in which the supplementary divider is adjusted.

My improvements (although applicable to most of the various kinds of harvesting-machines now used) are more especially adapted to those known as "combined reapers and mowers," of which class the harvester known as the "John H. Manny machine" is a type.

An apparatus which shall effectually separate the grain or grass to be cut (no matter how much lodged or tangled it may be) from that to be left standing until a succeeding tour of the machine around the field is of essential importance to the efficient operation of a harvester. Those familiar with the construction and mode of operation of the combined reapers and mowers heretofore used are aware that it is necessary in mowing to keep the point of the divider close to the surface of the ground in order to effect properly the separation of short or tangled stalks. The dividers as heretofore constructed being rigidly secured to the frame, it follows that when the cutters are elevated sufficiently for reaping the point of the divider is thrown up so high that it passes over lodged and tangled grain, instead of lifting and sustaining it until acted upon by the reel. Consequently, instead of being cut, such stalks are overrun by the machine, crushed down, and wasted.

It is the object of one part of my invention to remedy this defect; and my improvement for effecting this object consists in hinging or pivoting the supplementary divider, near its forward end, to the shoe or fixed divider, and supporting it near its rear end by means of a set-screw traversing a slot in an adjustable bracket secured upon the frame in such manner that the point of the supplementary divider may be adjusted either vertically or laterally to any desired position and retained therein.

In mowing lodged clover it is very desirable that the point of the divider should conform closely to the irregularities of the surface of the ground, in order to raise the prostrate stalks, and yet be free to rise in order to pass over obstacles. This the rigid shoe or divider heretofore employed cannot do; but I have provided a means whereby the object may effectually be attained; and to this end another branch of my improvement consists in combining with a supplementary divider, pivoted as above described, a spring arranged underneath the divider, near its rear end, in such manner as to compel the point of the divider to conform strictly to the surface of the ground, and yet permit it to yield to pass over obstacles.

The accompanying drawings represent a convenient arrangement of parts for carrying out the objects of my invention.

The construction of the frame A, shoe B, grain-wheel C, and sloping wing or grain-guard D, and their arrangement relatively to each other, need not be particularly described here, as such details are familiar to all skillful constructers of harvesters, and, besides, form no part of the subject-matter herein claimed.

In this instance the supplementary divider E, instead of being rigidly attached to the frame-work, as heretofore, is pivoted or hinged, near its front end, to the point of the shoe B by a pin, $b$. It is also provided with a set-screw, $f^3$, situated upon its inner side and near its rear end, which screw traverses in a vertical slot in an adjustable bracket, F. This bracket is bent near its middle at an angle of about thirty degrees, so as to form two parts, both of which are slotted. These parts assume an attitude relatively to each other such that when the lower part is inclined at an angle to correspond with the sloping wing D the upper part may be vertical, or nearly so, as shown in the drawings. The lower part of the bracket is also provided with a set-screw, $f^2$, to control its adjustment.

To adapt the machine for moving, I apply a spiral spring, G, to the outer side of the supplementary divider, back of the bracket F. This spring is retained in position by a rod, $g$, which it encircles, said rod being secured at its upper end to the supplementary divider, while its lower end plays freely through a hole in the sloping wing D, as shown in the drawings, by which arrangement the point of the divider will be constantly held close to the ground, and yet will be permitted to yield in order to pass over obstacles.

The operation of the device is as follows: In reaping the spring is of no importance, and may, in fact, be dispensed with. The supplementary divider is adjusted to the position shown in Fig. 1, and rigidly held there by tightening the upper set-screw, $f^3$; or it may be arranged and held as shown in Fig. 2. It should be borne in mind that when reaping the finger-beam is carried at an elevation much greater than that shown in the drawings, which represent the machine as mowing. In order to move the point of the supplementary divider laterally, to gather more or less grain to the cutting apparatus, the lower part of the bracket is moved in or out until the set-screw $f^2$ abuts against the ends of the slot, and secured in that position by tightening the set-screw. It will thus be seen that the vertical movements of the supplementary divider are regulated by the upper slot and set-screw, while its lateral adjustment is effected by the lower slot and set-screw, as shown by the red lines in Fig. 3. By this facility of adjustment I am enabled to raise and separate stalks that may lie even lower than the point of an ordinary rigid divider, and thus to effect a great saving of grain.

When mowing, the point of the supplementary divider runs along the ground, and the upper set-screw should be so adjusted as to allow the divider to play freely up and down upon its pivot or hinge, $b$. The spring G, acting upon the rear part of the supplementary divider, tends constantly to depress its point, thus compelling it to conform closely to the undulations of the ground. Should an unyielding obstacle be met, the spring would yield sufficiently to allow the supplementary divider to ride over it, and would again force it down as soon as the obstacle was passed.

It is obvious that the bracket and spring might be constructed and arranged in various ways without departing from the spirit of my invention; but a detailed description of such modifications is deemed unnecessary here, as they would readily suggest themselves to any intelligent constructer of harvesters after seeing my improvements.

I am aware that a supplementary divider rigidly secured to the frame, or so arranged as to be removable therefrom at pleasure, has heretofore been employed, and do not, therefore, broadly claim any such device; but What I do claim as my invention, and desire to secure by Letters Patent, is—

1. A supplementary divider pivoted near its point to the fixed divider or shoe of a harvester, in combination with an adjustable support near the rear end of said supplementary divider, substantially in the manner herein described, for the purpose set forth.

2. The combination of the supplementary divider, pivoted near its point to the fixed divider, with a spring, substantially as herein described, for the purpose set forth.

In testimony whereof I have hereunto subscribed my name.

F. H. MANNY.

Witnesses:
J. G. MANLOVE,
JOHN P. MANNY.